United States Patent
Watanabe et al.

(10) Patent No.: US 12,528,543 B2
(45) Date of Patent: Jan. 20, 2026

(54) PROTECTOR STRUCTURE FOR UNDERFLOOR COMPONENT

(71) Applicant: TOYOTA JIDOSHA KABUSHIKI KAISHA, Toyota (JP)

(72) Inventors: Katsuya Watanabe, Toyota (JP); Junichi Abe, Nagoya (JP); Masaki Maeda, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 384 days.

(21) Appl. No.: 18/220,950

(22) Filed: Jul. 12, 2023

(65) Prior Publication Data

US 2024/0025486 A1 Jan. 25, 2024

(30) Foreign Application Priority Data

Jul. 20, 2022 (JP) ................................. 2022-115883

(51) Int. Cl.
  B62D 25/20 (2006.01)
  B60R 3/02 (2006.01)
(52) U.S. Cl.
  CPC .............. B62D 25/20 (2013.01); B60R 3/02 (2013.01)

(58) Field of Classification Search
  CPC .................................. B62D 25/20; B60R 3/02
  See application file for complete search history.

(56) References Cited

U.S. PATENT DOCUMENTS 9,796,424 B2 * 10/2017 Sakaguchi ......... B62D 25/2036
2015/0174996 A1 * 6/2015 Ikeda .................. H01M 8/2465
  180/68.5

FOREIGN PATENT DOCUMENTS

| JP | 2013123956 A | * | 6/2013 |
| JP | 2021-070365 A | | 5/2021 |
| JP | 7261371 B2 | * | 4/2023 |

* cited by examiner

*Primary Examiner* — Faye M Fleming
(74) *Attorney, Agent, or Firm* — Dinsmore & Shohl LLP

(57) ABSTRACT

A protector structure for an underfloor component includes an underfloor component that is a high-voltage component or a fuel tank disposed under a floor of a vehicle, a boarding and alighting step disposed further laterally outward with respect to the underfloor component, and a protection member disposed between the underfloor component and the boarding and alighting step. The protection member includes a contact wall that laterally faces the boarding and alighting step and that is inclined laterally inward as the contact wall extends downward.

5 Claims, 7 Drawing Sheets

PROTECTOR STRUCTURE FOR UNDERFLOOR COMPONENT

CROSS REFERENCE TO RELATED APPLICATION

This application claims priority to Japanese Patent Application No. 2022-115883 filed on Jul. 20, 2022, which is incorporated herein by reference in its entirety including the specification, claims, drawings, and abstract.

TECHNICAL FIELD

The present specification discloses a protector structure for an underfloor component, such as a high-voltage component or a fuel tank, disposed under the floor of a vehicle. A protector structure for an underfloor component will be hereinafter referred to as an "underfloor component protector structure".

BACKGROUND

Conventional structures for disposing a high-voltage component such as a battery, an inverter, and a high voltage cable, or a fuel tank under the floor of a vehicle have been known. In the following description, a high-voltage component or a fuel tank disposed under the floor will be referred to as an "underfloor component". Disposing a boarding and alighting step that helps an occupant board and alight from the vehicle, in addition to such an underfloor component, at a lateral end, or an end along the vehicle with, of the vehicle is also proposed.

JP 2013-123956 A, for example, discloses a structure including a battery frame configured to support a battery disposed under the floor, and a side step for use in boarding and alighting from a vehicle. The battery frame disclosed in JP 2013-123956 A includes a side frame at a laterally outward side of the battery frame and the side step is integral with a laterally outward side of the side frame. This configuration enables securing of strength and rigidity of the side step with a reduced number of components.

In a side collision in which an obstacle crashes into a side of a vehicle, an underfloor component such as a high-voltage component or a fuel tank must be properly protected. Vehicles with a boarding and alighting step may have a disadvantage in that an impact load at the time of such a side collision is transmitted, via the boarding and alighting step, to the underfloor component, resulting in insufficient protection of the underfloor component. This problem has not been thoroughly discussed until now.

The present specification therefore discloses an underfloor component protector structure which includes a boarding and alighting step and enables proper protection of an underfloor component at the time of a side collision.

SUMMARY

The underfloor component protector structure disclosed in the present specification includes an underfloor component that is a high-voltage component or a fuel tank and is disposed under a floor of a vehicle, a boarding and alighting step disposed further laterally outward with respect to the underfloor component, and a protection member disposed between the underfloor component and the boarding and alighting step. The protection member includes a contact wall that laterally faces the boarding and alighting step and that is inclined laterally inward as the contact wall extends downward.

This configuration causes the boarding and alighting step impacting against the contact wall in a side collision to receive a downward reaction force from the contact wall at a laterally inward end of the boarding and alighting step. This further causes the boarding and alighting step to rotate in such a manner that the laterally inward end moves downward. It is therefore possible to effectively prevent direct or indirect impact of the boarding and alighting step against the underfloor component to thereby properly protect the underfloor component.

In this configuration, the boarding and alighting step may include a first attachment portion fastened to part of a vehicle body, and a second attachment portion fastened to part of the vehicle body at a location further laterally inward with respect to the first attachment portion. A downward force applied to a laterally inward end of the boarding and alighting step may unfasten the second attachment portion from the vehicle body more preferentially than unfastening of the first attachment portion from the vehicle body.

This configuration supports the boarding and alighting step only with the first attachment portion at the time of a side collision to facilitate rotation of the boarding and alighting step. This results in further reliable protection of the underfloor component.

In this configuration, the second attachment portion may include a brittle part that is likely to rupture or deform due to a stress locally concentrated on the brittle part by application of a downward force to the laterally inward end of the boarding and alighting step.

This configuration enables further reliable unfastening of the second attachment portion from the vehicle body at the time of a side collision.

The underfloor component protector structure may further include an underfloor frame that is a vehicle body frame extending along a vehicle length under the floor of the vehicle between the contact wall and the underfloor component, and a component support member configured to support the underfloor component and attached to a bottom face of the underfloor frame. The protection member may further include an upper reinforcing member disposed between the contact wall and the underfloor frame and configured to transmit a laterally inward load to be received from the contact wall to the underfloor frame and a lower reinforcing member disposed between the contact wall and the component support member at a location below the upper reinforcing member and configured to transmit a laterally inward load to be received from the contact wall to the component support member.

This configuration enables transmission of the load applied to the contact wall to the underfloor frame and the component support member in a dispersed manner. This reduces deformation of the contact wall and enables more reliable acting of the downward reaction force on the boarding and alighting step, thereby protecting the underfloor component more reliably.

In this configuration, the protection member may have a bottom face including two or more cut portions at a laterally inward edge of the bottom face, and the component support member may have laterally outward edges that extend into the cut portions, respectively. Peripheral edges of the cut portions and the laterally outward edges of the component support member are laterally apart from each other This configuration enables transmission of part of the impact load to the component support member at the time of a side collision. Until a side collision, the cut portions and the component support member are apart from each other along the vehicle width and have some space between the cut portions and the component support member. This configuration facilitates assembling of the protection member.

The underfloor component protector structure according to the disclosure enables proper protection of the underfloor component at the time of a side collision.

BRIEF DESCRIPTION OF DRAWINGS

Embodiments of the present disclosure will be described by reference to the following figures, wherein.

DESCRIPTION OF EMBODIMENTS

Figure 1:
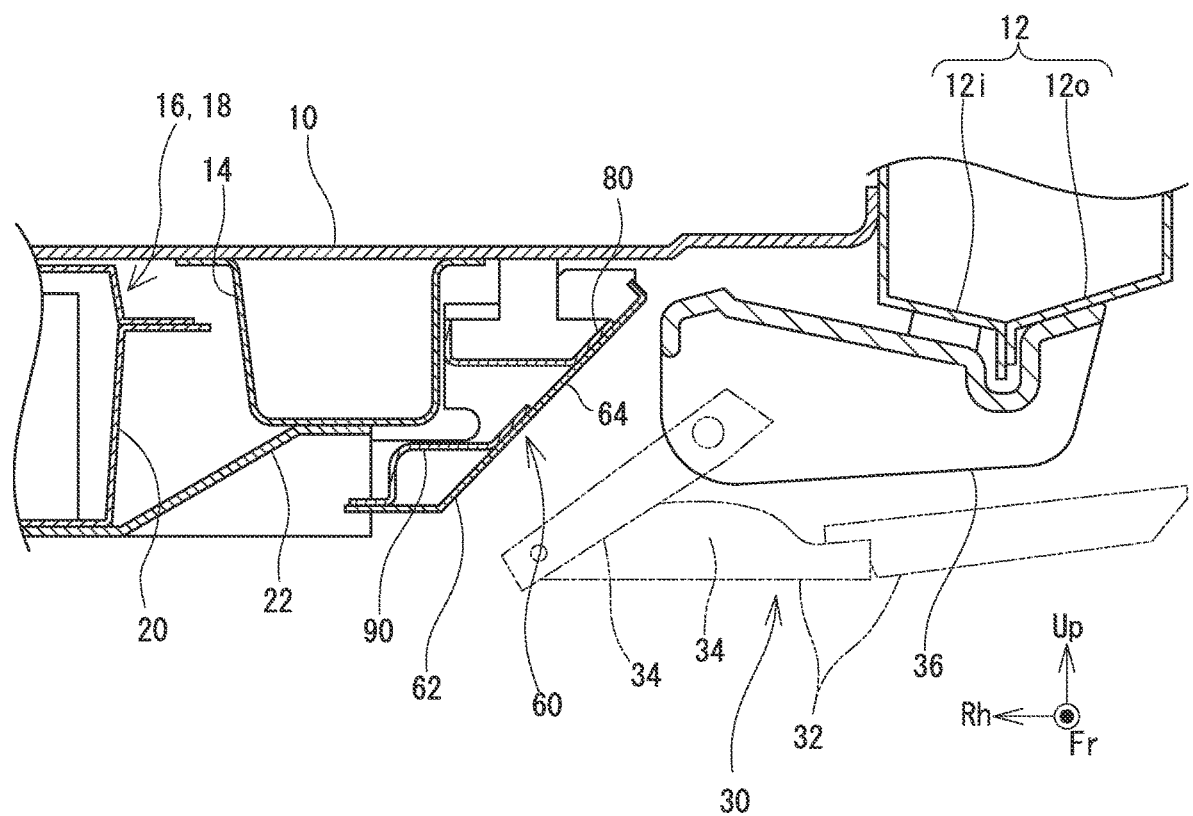
FIG. 1 is a cross sectional view of a lower part of a vehicle taken along a line parallel to the vehicle width direction or lateral direction.

Referring to the drawings, a protector structure for an underfloor component 16 will be described below. FIG. 1 is a cross sectional view of a lower part of a vehicle taken along a line parallel to a width direction or lateral direction of the vehicle. In the following description, signs "Fr", "Up", and "Rh" denote frontward, upward and rightward, respectively, of the vehicle.

As illustrated in FIG. 1, a floor panel 10 that functions as a floor face of a vehicle cabin is disposed in a lower part of a vehicle. Each lateral end of the floor panel 10 along the vehicle width is joined to a side sill 12 that is a frame member elongated longitudinally or along the length of the vehicle. The side sill 12 includes an inner side sill 12i, and an outer side sill 12o located further laterally outward or further outward along the vehicle width, from the inner side sill 12i. The inner side sill 12i and the outer side sill 12o are joined to each other. The inner side sill 12i and the outer side sill 12o are each panel members having a substantially hat-shape cross section.

An under reinforcement 14 is joined to a bottom face of the floor panel 10. The under reinforcement 14 is an underfloor frame disposed to reinforce the floor panel 10. The under reinforcement 14 is opened upward and has a channel shape elongated along the vehicle length.

A battery unit 18 is disposed under the floor panel 10 and further laterally inward with respect to the under reinforcement 14. The battery unit 18 is a high-voltage component that accumulates power required for travelling of the vehicle, for example, and is an underfloor component 16 disposed under the floor of the vehicle. The battery unit 18 includes a battery case 20 that houses battery components. The battery case 20 is placed on and fixed to a component support member 22.

Figure 4:
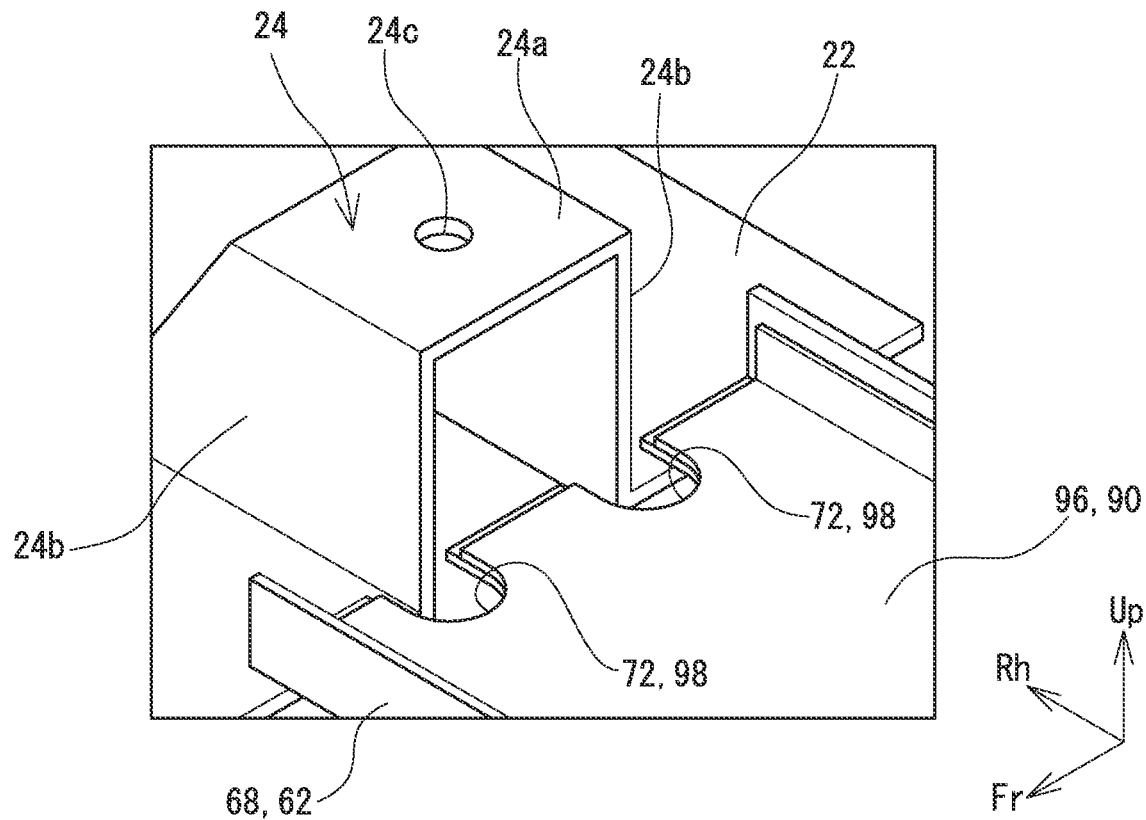
FIG. 4 is a schematic perspective view of a raised portion and a peripheral region thereof.

The component support member 22 supports the battery unit 18 under the floor. More specifically, the component support member 22 is a plate member on which the battery unit 18 can be placed. The component support member 22 includes, at a lateral end, a raised portion 24 partially raised upward. FIG. 4 is a schematic perspective view of the raised portion 24 and its peripheral region. A top surface 24a of the raised portion 24 includes a fastening hole 24c that allows a fastening bolt (not shown) to pass through. The component support member 22 is fastened to a bottom face of the under reinforcement 14 with the fastening bolt that is inserted through the fastening hole 24c.

As illustrated in FIG. 1, a boarding and alighting step 30 is attached to a bottom face of the side sill 12. The boarding and alighting step 30 assists boarding and alighting actions of an occupant with respect to the vehicle, and may have any specific configuration. In the present embodiment, the boarding and alighting step 30 includes a step body 32, a pivot arm 34, and an attachment bracket 36. The step body 32 and the pivot arm 34 are actually located further toward the viewer from a cross sectional sheet plane in FIG. 1 and FIG. 1 illustrates shapes of the step body 32 and the pivot arm 34 using a phantom line.

The step body 32 is a mount that an occupant moves up and down. The step body 32, when not in use, is withdrawn laterally inward to prevent significant protrusion from a side wall of the vehicle, and when in use, protrudes significantly laterally outward from the side wall of the vehicle. The step body 32 is coupled to the attachment bracket 36 via the pivot arm 34. The pivot arm 34 has an upper end connected with the attachment bracket 36 and a lower end connected with the step body 32. The pivot arm 34 pivots about a rotation shaft disposed at the upper end of the pivot arm 34 to thereby enable the step body 32 to move forward and rearward along the vehicle width.

Figure 2:
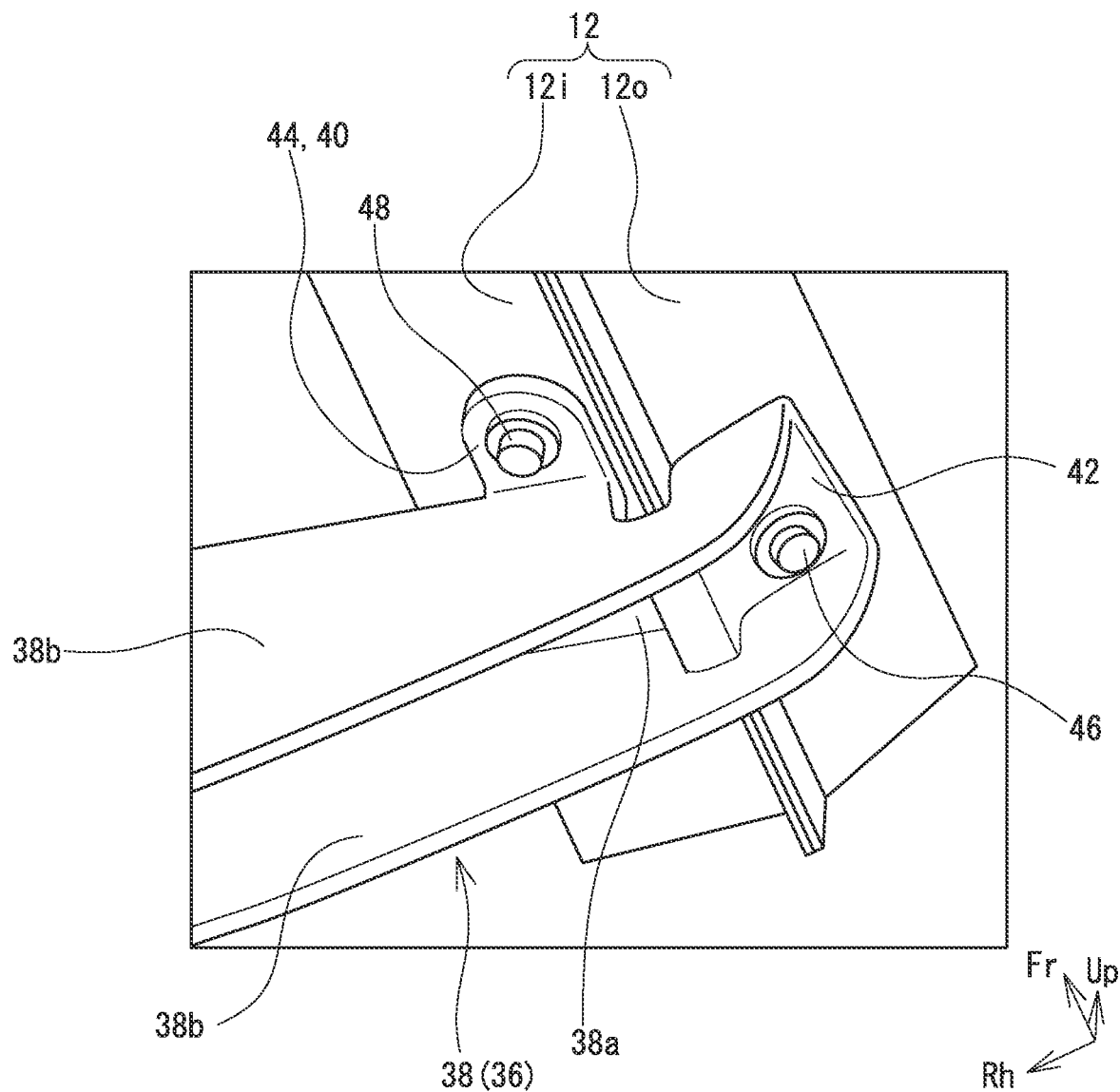
FIG. 2 is perspective view of an attachment bracket viewed from below.

The attachment bracket 36 is fastened to a frame member of the vehicle, which is specifically the bottom face of the side sill 12. FIG. 2 is a perspective view of the attachment bracket 36 viewed from below. As illustrated in FIG. 2, the attachment bracket 36 includes a bracket body 38 having a channel shape opened downward, and a flange 40 protruding longitudinally or along the vehicle length from opposite edges of the bracket body 38 in the vehicle length or longitudinal direction. The bracket body 38 includes a bracket top 38a facing downward and a pair of bracket side walls 38b extending downward from opposite edges of the bracket top 38a in the vehicle length or longitudinal direction. A laterally outward end portion of the bracket top 38a functions as a first attachment portion 42 that is fastened to the outer side sill 12o via a first fastening bolt 46.

The flange 40 is located further laterally inward with respect to the first attachment portion 42, and extends longitudinally outward from an upper edge of the bracket side wall 38b. The flange 40 further functions as a second attachment portion 44 that is fastened to the inner side sill 12i via a second fastening bolt 48.

Figure 3:
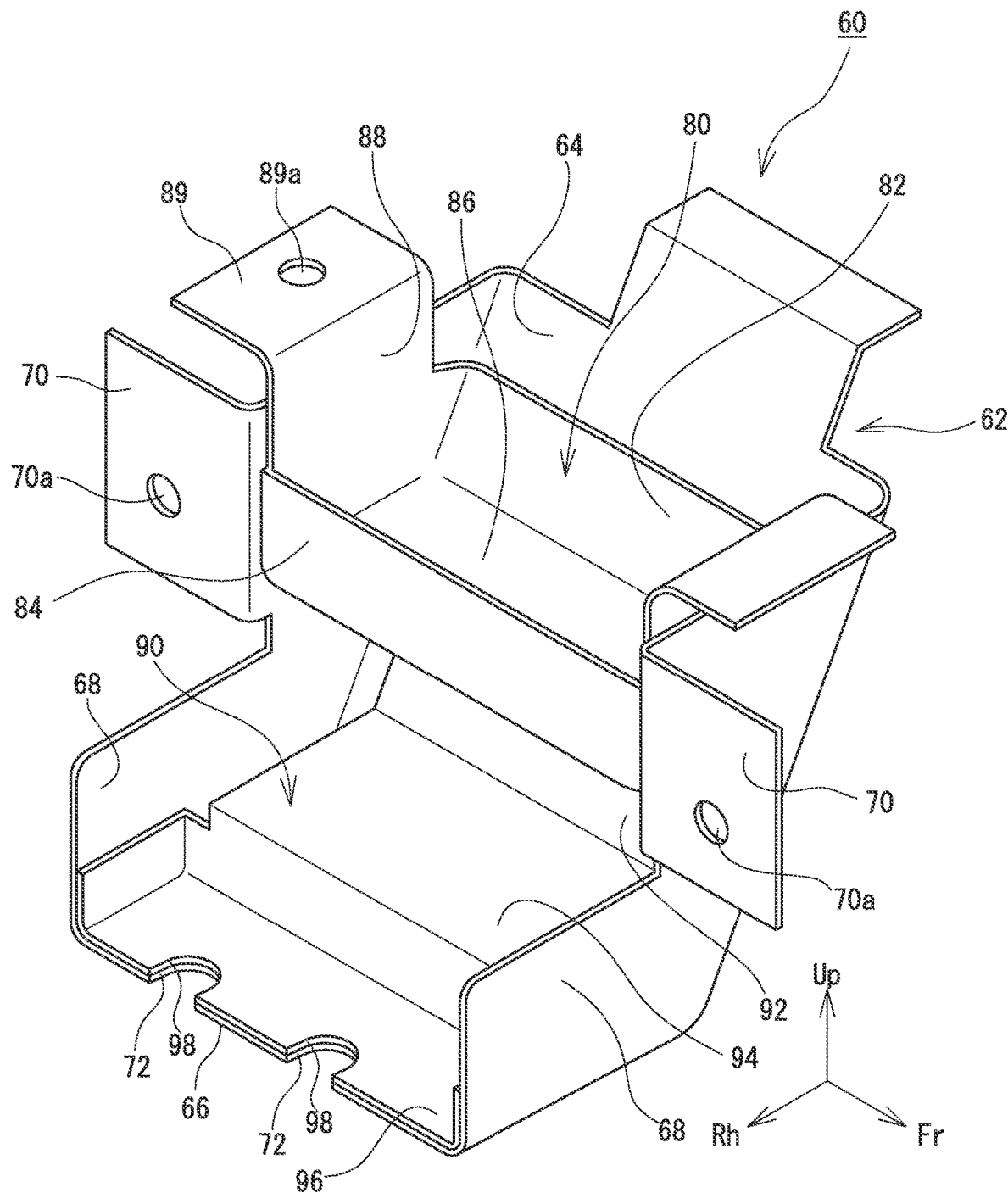
FIG. 3 is a schematic perspective view of a protection member.

As illustrated in FIG. 1, a protection member 60 is further disposed between the boarding and alighting step 30 and the battery unit 18. The protection member 60 protects the battery unit 18 or the underfloor component 16, and includes a body 62, an upper reinforcing member 80, and a lower reinforcing member 90. The protection member 60 will be described by reference to FIG. 1, FIG. 3, and FIG. 4. FIG. 3 is a schematic perspective view of the protection member 60.

As illustrated in FIG. 3, the body 62 includes a contact wall 64, a bottom wall 66, a pair of side walls 68, and a pair of attachment flanges 70. As illustrated in FIG. 1, the contact wall 64 is disposed under the floor panel 10 at a location laterally facing the boarding and alighting step 30. The contact wall 64 is inclined to extend laterally inward as the contact wall 64 extends downward. The bottom wall 66 extends laterally inward from a lower end of the contact wall 64. As illustrated in FIG. 3, the bottom wall 66 includes, at a laterally inward edge, two cut portions 72 at intervals along the vehicle length.

The side walls 68 stand from opposite longitudinal edges of the contact wall 64 and the bottom wall 66. The attachment flange 70 protrudes longitudinally outward from the side wall 68. Each attachment flange 70 includes a fastening hole 70a. The body 62 is fastened to the under reinforcement 14 that is a frame member via a fastening bolt (not shown) inserted through the fastening hole 70a.

The upper reinforcing member 80 is joined to an upper part of the body 62, and the lower reinforcing member 90 is joined to a lower part of the body 62. As illustrated in FIG. 3, the upper reinforcing member 80 has a substantially box shape including a bottom wall 86, an inner wall 84, an outer wall 82, and a pair of side walls 88. The outer wall 82 of the upper reinforcing member 80 is inclined along the contact wall 64 of the body 62 and is superposed on the contact wall 64 in the thickness direction. The inner wall 84 is substantially parallel to the side wall of the under reinforcement 14 to enable plane contact with the side wall of the under reinforcement 14. A flange 89 protrudes rearward of the vehicle from the side wall 88 that is located rearward of the vehicle. The flange 89 includes a fastening hole 89a, and the upper reinforcing member 80 is joined to the floor panel 10 via a fastening bolt (not shown) inserted through the fastening hole 89a.

The lower reinforcing member 90 includes an upper wall 92, a step portion 94, and a lower wall 96. The upper wall 92 is inclined along the contact wall 64 of the body 62 and is superposed on the contact wall 64 in the thickness direction. The lower wall 96 is superposed on the bottom wall 66 of the body 62. The lower wall 96, similar to the body 62, includes cut portions 98 in regions superposed on the cut portions 72 of the body 62. The step portion 94 is a stair-like part connecting the upper wall 92 and the lower wall 96, and is located below the under reinforcement 14.

As illustrated in FIG. 4, the raised portion 24 includes the top surface 24a fastened to the under reinforcement 14, and vertical faces 24b extending downward from opposite edges of the top surface 24a in the vehicle length or longitudinal direction. The vertical faces 24b extend into the corresponding cut portions 72 and cut portions 98 of the protection member 60. At the time of a side collision, when the protection member 60 moves laterally inward and brings peripheral edges of the cut portions 72 and 98 into contact with edges of the vertical faces 24b, this configuration enables laterally inward load that is applied to the protection member 60 to be partially transmitted to the component support member 22. Here, the peripheral edges of the cut portions 72 and 98, upon contacting the edges of the vertical faces 24b, receive significant force. In the present embodiment, the configuration in which the bottom wall 66 of the body 62 and the upper wall 92 of the lower reinforcing member 90 are vertically superposed effectively prevents deformation or damage of the peripheral edges of the cut portions 72 and 98 receiving the significant force.

As illustrated in FIG. 4, there is some space between the peripheral edges of the cut portions 72 and 98 and the edge of the vertical face 24b. Such a space prevents interference between the protection member 60 and the component support member 22 even with insufficient accuracy of dimension or insufficient accuracy of assembly of the protection member 60. In other words, the structure designed to allow a space between the protection member 60 and the component support member 22 facilitates assembling operation of the protection member 60.

Figure 5:
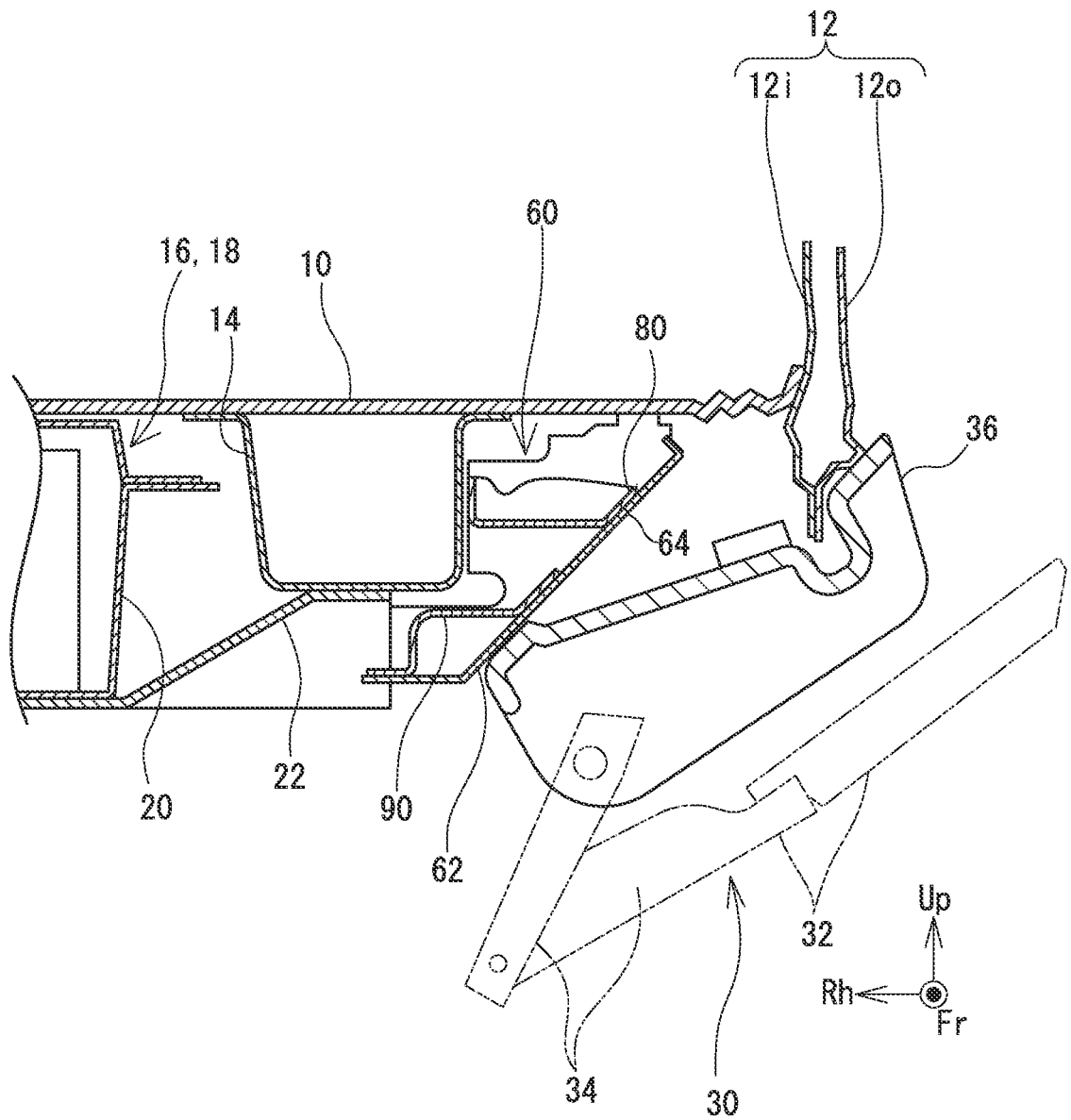
FIG. 5 is a cross sectional view of the protection member and its peripheral region in a side collision.

The reason for disposing the protection member 60 described above will be described by reference to FIG. 5 that is a cross sectional view of the protection member 60 and its peripheral region at the time of a side collision. At the time of a side collision where a side of the vehicle is struck by an obstacle, the side sill 12 and part of the floor panel 10 are compressed laterally or along the vehicle width, as illustrated in FIG. 5. In the absence of the protection member 60, deformation of the side sill 12 and the like by such compression may further cause the boarding and alighting step 30 to significantly move laterally inward and partially strike against the battery unit 18 directly or indirectly via the component support member 22. In the present embodiment, the protection member 60 is disposed to avoid an impact of the boarding and alighting step 30 on the battery unit 18.

As described above, the protection member 60 includes the contact wall 64 laterally facing the attachment bracket 36 of the boarding and alighting step 30. The contact wall 64 is inclined to extend laterally inward as the contact wall 64 extends downward. This configuration enables the contact wall 64, receiving a laterally inward force, to generate a downward reaction force. Therefore, at the time of a side collision, the attachment bracket 36, moving laterally inward and further hitting against the contact wall 64, receives the downward force at its laterally inward end. On receiving such a downward force, the attachment bracket 36 rotates about the periphery of the first attachment portion 42 in such a manner that the laterally inward end of the attachment bracket 36 moves downward, as illustrated in FIG. 5. In the following description, this rotation of the attachment bracket 36 will be referred to as "withdrawal behavior". This withdrawal behavior effectively prevents direct or indirect impact of the boarding and alighting step 30 on the battery unit 18.

As described above, in the present embodiment, the first attachment portion 42 of the attachment bracket 36 is fastened to the outer side sill 12o and the second attachment portion 44 is fastened to the inner side sill 12i, and the second attachment portion 44 is the flange 40 protruding vehicle lengthwise from the bracket body 38. The downward force applied to the laterally inward end of the attachment bracket 36 causes concentration of stress more on the base of the flange 40 than on the first attachment portion 42, making the flange 40 likely to rupture. Rupturing the base of the flange 40 unfastens the attachment bracket 36 from the inner side sill 12i, which results in the attachment bracket 36 being fastened only with the outer side sill 12o. This state allows the attachment bracket 36 to more easily rotate about the periphery of the first attachment portion 42 and about a shaft substantially parallel to the vehicle length. This further effectively prevents impact of the boarding and alighting step 30 with the battery unit 18.

Removing and dropping the entire boarding and alighting step 30 from the side sill 12 and then from the vehicle at the time of a side collision disenables control of movement of the boarding and alighting step 30. In the present embodiment, the protector structure is configured to unfasten the second attachment portion 44 more preferentially than the first attachment portion 42 to allow the fastening at the first attachment portion 42 to be maintained at the time of a side collision. This configuration allows fastening between the boarding and alighting step 30 and the side sill 12 via the first attachment portion 42 at the time of a side collision, thereby effectively preventing removal of the boarding and alighting step 30 from the vehicle.

To apply the downward reaction force to the attachment bracket 36, the contact wall 64 needs to maintain the inclined state with no or minimum deformation. In the present embodiment, the upper reinforcing member 80 and the lower reinforcing member 90 are disposed to transmit part of the load applied from the attachment bracket 36 to the under reinforcement 14 and the component support member 22 in a dispersed manner via the reinforcing members 80 and 90. To enable transmission of the load without deformation of the upper reinforcing member 80, the upper reinforcing member 80 has a substantially box shape to increase rigidity. Similarly, to enable transmission of the load to the component support member 22 without deformation of the lower reinforcing member 90, the lower reinforcing member 90 has the step portion 94 to increase rigidity. This configuration makes the contact wall 64 unlikely to deform to enable further reliable application of the downward reaction force to the attachment bracket 36.

As is clear from the above description, in the present embodiment, the contact wall 64, that is inclined to extend laterally inward as the contact wall 64 extends downward, is disposed between the boarding and alighting step 30 and the battery unit 18. This configuration enables application of the downward reaction force to the laterally inward end of the boarding and alighting step 30 at the time of a side collision, thereby effectively preventing direct or indirect impact of the boarding and alighting step 30 against the battery unit 18. It should be noted that the configuration described above is only an example, and any modifications may be made other than the protection member 60 including the contact wall 64.

Figure 6A:
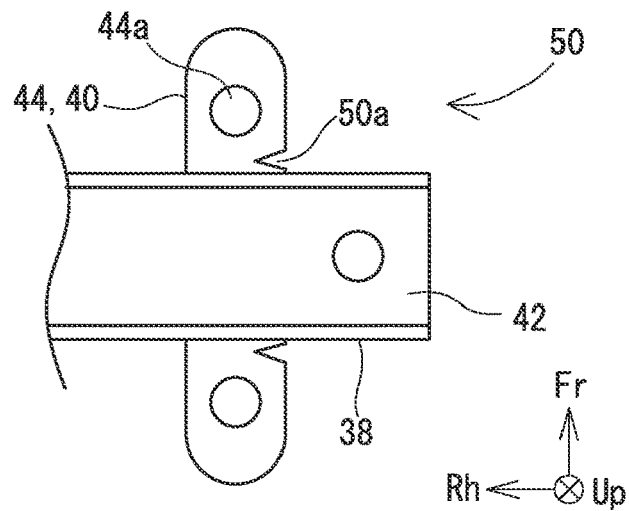
FIG. 6A illustrates an example brittle part.
Figure 6B:
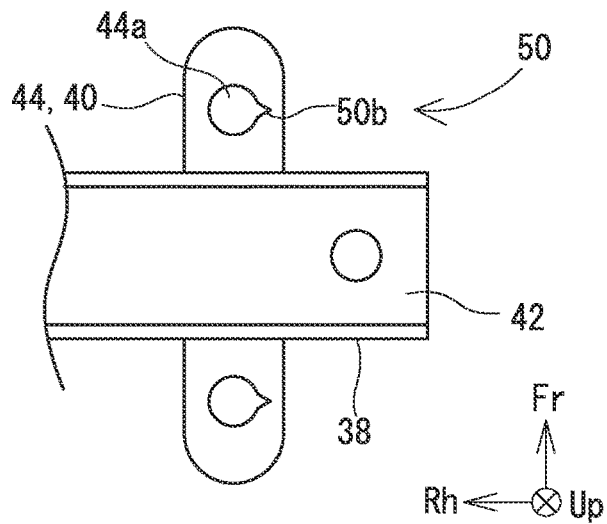
FIG. 6B illustrates another example brittle part.
Figure 6C:
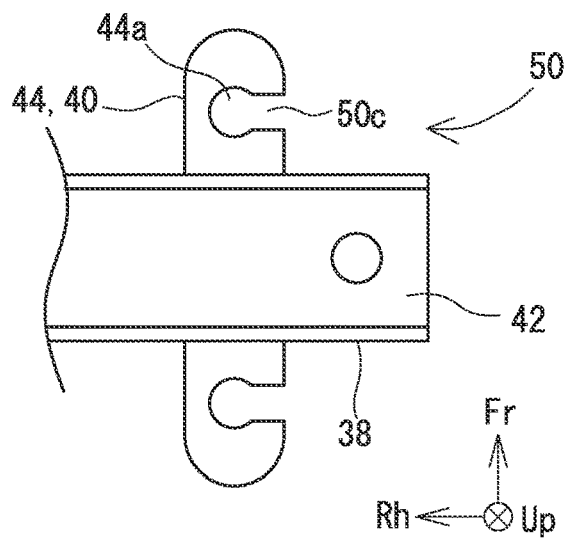
FIG. 6C illustrates a further example brittle part.

For example, to induce unfastening of the second attachment portion 44 from the side sill 12, the second attachment portion 44 may include a brittle part 50 which is easy to rupture or deform. The second attachment portion 44, for example, may include a notch at the base of the flange 40 as illustrated in FIG. 6A or may include a notch 50b in the fastening hole 44a as illustrated in FIG. 6B. Alternatively, the second attachment portion 44 may include a slit 50c connecting the fastening hole 44a and a laterally outward end of the attachment flange 70, as illustrated in FIG. 6C.

Figure 7:
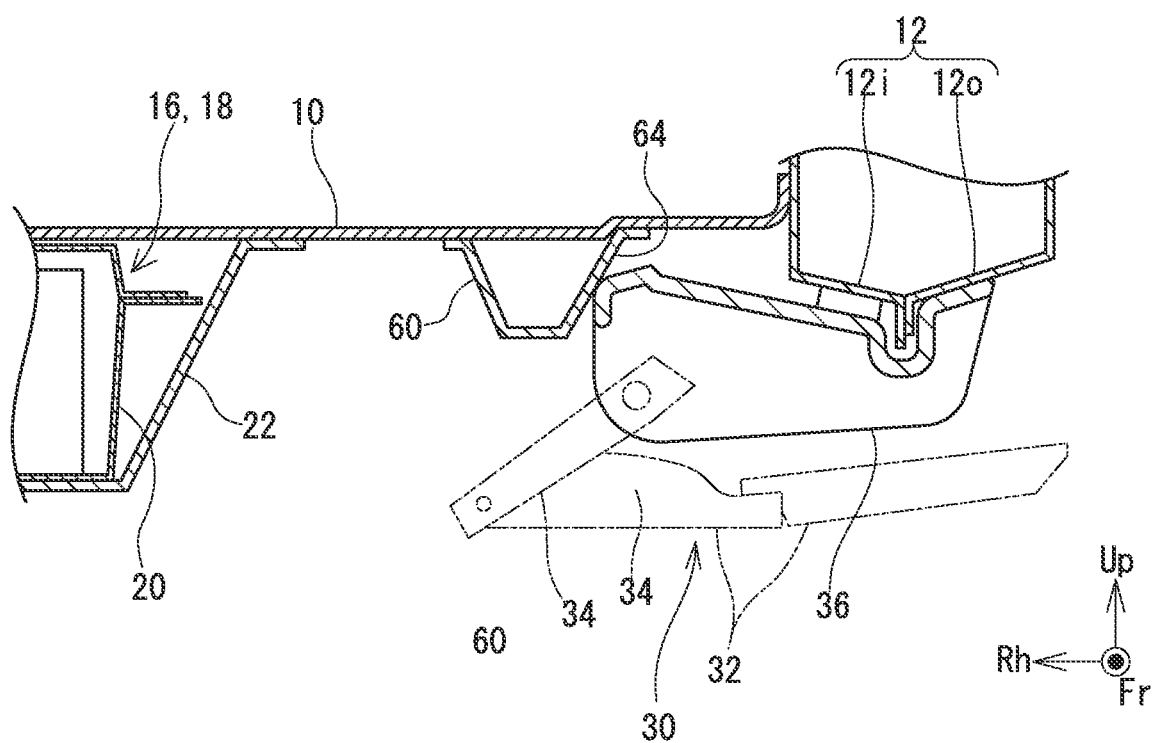
FIG. 7 is a cross sectional view of another example protector structure for an underfloor component.

While the protection member 60 needs to include the contact wall 64 that is inclined to extend laterally inward as the contact wall 64 extends downward, other configurations may be modified. For example, the protection member 60 may have neither the upper reinforcing member 80 nor the lower reinforcing member 90, as illustrated in FIG. 7. Further, the protection member 60 need not be a specific member disposed only for protection of the underfloor component 16, and a frame member of the vehicle, such as part of the under reinforcement 14 and the cross member (not shown), may be used as the protection member 60 including the contact wall 64.

In the above examples, the underfloor component 16 to be protected by the protection member 60 is the battery unit 18. However, the underfloor component 16 may be any component that is a high-voltage component or a fuel tank located further laterally inward with respect to the boarding and alighting step 30. For example, the underfloor component 16 may be an inverter, a high voltage cable, or a fuel tank.

REFERENCE SIGN LIST 10 floor panel, 12 side sill, 14 under reinforcement, 16 underfloor component, 18 battery unit, 20 battery case, 22 component support member, 24 raised portion, 30 boarding and alighting step, 32 step body, 34 pivot arm, 36 attachment bracket, 38 bracket body, 40 flange, 42 first attachment portion, 44 second attachment portion, 46 first fastening bolt, 48 second fastening bolt, 50 brittle part, 60 protection member, 62 body, 64 contact wall, 66 bottom wall, 68 side wall, 70 attachment flange, 72, 98 cut portion, 80 upper reinforcing member, 82 outer wall, 84 inner wall, 86 bottom wall, 88 side wall, 89 flange, 90 lower reinforcing member, 92 upper wall, 94 step portion, 96 lower wall.

The invention claimed is:

1. An underfloor component protector structure comprising:
   an underfloor component disposed under a floor of a vehicle, the underfloor component being a high-voltage component or a fuel tank;
   a boarding and alighting step disposed further laterally outward with respect to the underfloor component; and
   a protection member disposed between the underfloor component and the boarding and alighting step,
   wherein the protection member comprises a contact wall laterally facing the boarding and alighting step, the contact wall being inclined laterally inward as the contact wall extends downward;
   wherein the boarding and alighting step comprises:
      a first attachment portion fastened to part of a vehicle body; and
      a second attachment portion fastened to part of the vehicle body at a location further laterally inward with respect to the first attachment portion; and
   wherein a downward force applied to a laterally inward end of the boarding and alighting step unfastens the second attachment portion from the vehicle body more preferentially than unfastening of the first attachment portion from the vehicle body.

2. The underfloor component protector structure according to claim 1, wherein
   the second attachment portion comprises a brittle part that is likely to rupture or deform due to a stress locally concentrated on the brittle part by application of a downward force to the laterally inward end of the boarding and alighting step.

3. The underfloor component protector structure according to claim 1, further comprising:
   an underfloor frame that is a vehicle body frame extending along a vehicle length under the floor of the vehicle between the contact wall and the underfloor component; and
   a component support member configured to support the underfloor component and attached to a bottom face of the underfloor frame,
   wherein the protection member further comprises:
   an upper reinforcing member disposed between the contact wall and the underfloor frame, the upper reinforcing member configured to transmit a laterally inward load to the underfloor frame, the laterally inward load to be received from the contact wall;
   a lower reinforcing member disposed between the contact wall and the component support member at a location below the upper reinforcing member, the lower reinforcing member configured to transmit a laterally inward load to the component support member, the laterally inward load to be received from the contact wall.

4. The underfloor component protector structure according to claim 3, wherein the protection member has a bottom face including two or more cut portions at a laterally inward edge of the bottom face, the component support member has laterally outward edges that extend into the cut portions, respectively, and peripheral edges of the cut portions and the laterally outward edges of the component support member are laterally apart from each other.

5. An underfloor component protector structure comprising:

an underfloor component disposed under a floor of a vehicle, the underfloor component being a high-voltage component or a fuel tank;

a boarding and alighting step disposed further laterally outward with respect to the underfloor component;

a protection member disposed between the underfloor component and the boarding and alighting step;

an underfloor frame that is a vehicle body frame extending along a vehicle length under the floor of the vehicle between the contact wall and the underfloor component; and a component support member configured to support the underfloor component and attached to a bottom face of the underfloor frame, wherein the protection member comprises a contact wall laterally facing the boarding and alighting step, the contact wall being inclined laterally inward as the contact wall extends downward, wherein the protection member further comprises:

an upper reinforcing member disposed between the contact wall and the underfloor frame, the upper reinforcing member configured to transmit a laterally inward load to the underfloor frame, the laterally inward load to be received from the contact wall;

a lower reinforcing member disposed between the contact wall and the component support member at a location below the upper reinforcing member, the lower reinforcing member configured to transmit a laterally inward load to the component support member, the laterally inward load to be received from the contact wall;

wherein the protection member has a bottom face including two or more cut portions at a laterally inward edge of the bottom face, wherein the component support member has laterally outward edges that extend into the cut portions, respectively, and wherein peripheral edges of the cut portions and the laterally outward edges of the component support member are laterally apart from each other.

* * * * *